United States Patent
Moon et al.

(10) Patent No.: US 7,360,481 B2
(45) Date of Patent: *Apr. 22, 2008

(54) COFFEE ROASTER HAVING AN APPARATUS FOR INCREASING AIRFLOW IN A ROASTING CHAMBER

(75) Inventors: Jung S. Moon, Buffalo Grove, IL (US); Rong Liu, Gurnee, IL (US); Kitak Chae, Seoul (KR); Jongrok Kim, Seoul (KR)

(73) Assignee: Hearthware Home Products, Inc., Gurnee, IL (US)

( * ) Notice: Subject to any disclaimer, the term of this patent is extended or adjusted under 35 U.S.C. 154(b) by 433 days.

This patent is subject to a terminal disclaimer.

(21) Appl. No.: 10/722,793

(22) Filed: Nov. 26, 2003

(65) Prior Publication Data

US 2004/0105922 A1 Jun. 3, 2004

Related U.S. Application Data

(63) Continuation-in-part of application No. 10/137,671, filed on May 2, 2002, now Pat. No. 6,770,315.

(51) Int. Cl.
*A23N 12/00* (2006.01)

(52) U.S. Cl. .................... 99/483; 99/286; 99/476; 34/233; 34/594

(58) Field of Classification Search ................ 99/286, 99/323.5, 323.7, 357, 467–476, 483, 518, 99/516, 600–611; 34/233, 232, 360, 136, 34/576, 594, 577, 586, 394, 395; 219/385, 219/386, 400, 399; 426/465–467, 523
See application file for complete search history.

(56) References Cited

U.S. PATENT DOCUMENTS

| | | | |
|---|---|---|---|
| 4,325,191 A | 4/1982 | Kumagai et al. | 34/54 |
| 4,602,147 A | 7/1986 | Gell | 219/509 |
| 4,871,901 A | 10/1989 | Igusa et al. | 219/400 |
| 5,269,072 A | 12/1993 | Waligorski | 34/57 E |
| 5,394,623 A | 3/1995 | Sewell | 34/544 |
| 5,500,237 A | 3/1996 | Gell, Jr. et al. | 426/466 |
| 5,564,331 A | 10/1996 | Song | 99/469 |
| 5,749,288 A * | 5/1998 | Skaling | 99/483 |
| 5,890,418 A * | 4/1999 | Song | 99/323.7 |
| 5,902,623 A * | 5/1999 | Cochran | 426/466 |
| 5,943,790 A * | 8/1999 | Gell, Jr. | 34/606 |
| 5,996,480 A | 12/1999 | Kelley et al. | 99/468 |
| 6,053,093 A | 4/2000 | Gerhardt et al. | 99/331 |
| 6,112,644 A * | 9/2000 | Song | 99/323.7 |
| 6,460,451 B1 * | 10/2002 | Helman et al. | 99/323.5 |
| 6,770,315 B2 * | 8/2004 | Moon et al. | 426/466 |

FOREIGN PATENT DOCUMENTS

JP     04023976 A *  1/1992

* cited by examiner

*Primary Examiner*—Timothy F. Simone
(74) *Attorney, Agent, or Firm*—Greer, Burns & Crain, Ltd.

(57) ABSTRACT

A roaster for roasting coffee beans includes a roasting chamber having a top and a bottom. A cover is seated on the top of the roasting chamber and a bottom of the roasting chamber is seated on a base. A hot air supply is provided in the base for supplying hot airflow into the roasting chamber for heating the coffee beans. At least one air opening is formed on the bottom for enabling the airflow to enter the roasting chamber. A wind tunnel is provided over the air opening for increasing the speed of the airflow in the roasting chamber as the airflow passes through the wind tunnel.

16 Claims, 14 Drawing Sheets

FIG. 14

COFFEE ROASTER HAVING AN APPARATUS FOR INCREASING AIRFLOW IN A ROASTING CHAMBER

This application is a continuation-in-part of prior application Ser. No. 10/137,671, filed May 2, 2002, now U.S. Pat. No. 6,770,315.

The present invention generally relates to coffee roasters, and more particularly to a coffee roaster that has a wind tunnel for increasing the speed of airflow in the roasting chamber without a corresponding RPM increase in the motor that creates the airflow, and a vent attachment for directing smoke from the roasting coffee beans away from the roaster.

BACKGROUND

A demand for coffee roasters for home use has been on the rise in response to growing number of devoted coffee drinkers who desire the flavor of freshly roasted coffee. These home coffee roasters typically have a heating element and a fan for directing hot air into a roasting chamber where the coffee beans are roasted as they are blown around by a hot air stream. The controls on these roasters typically include a variable timer that allows beans to be roasted at a constant temperature for a prescribed time. Coffee beans come in different densities and have varying moisture content. As a result, roasting coffee beans at a constant temperature for a prescribed time, as in conventional coffee roasters, do not always result in consistent and fully developed flavor that coffee enthusiasts desire.

There are coffee roasters that have more than one roasting stages, where coffee beans are roasted, for example, at one temperature for some time and at another temperature for a certain other time period. These roasters, however, do not have the means for maintaining the desired roasting temperature when the ambient temperature varies. Depending on the ambient temperature in which the roaster is operated, there could be a significant temperature variation in the roasting chamber from the desired temperature. For example, some users are known to place the coffee roaster outside the home during use, so as not to have smoke from the roaster fill the inside the house. In such a situation, the temperature inside the roasting chamber may not be at the desired temperatures, resulting in the beans being over or under roasted.

Known coffee roasters have motors that drive the fan at a relatively high RPM. Consequently, the noise level generated by the coffee roaster can be of nuisance. On the other hand, coffee roasters with motors that operate at low RPM have a low noise level and may increase motor life. However, the airflow generated by these roasters is sufficient to mix and roast only a small amount of coffee beans. Also, coffee roasters that are intended for home use are relatively small, so as to be aesthetically attractive to consumers. As a result, the amount of beans that can be roasted are also constrained by the size of the roasting chamber of the roaster. Another disadvantage of known roasters is that they generate uncomfortable amount smoke.

SUMMARY OF THE INVENTION

The present invention is directed to a roaster for roasting coffee beans and includes a roasting chamber having a top and a bottom. A cover is seated on the top of the roasting chamber and a bottom of the roasting chamber is seated on a base. A hot air supply is provided in the base for supplying hot airflow into the roasting chamber for heating the coffee beans. At least one air opening is formed on the bottom for enabling the airflow to enter the roasting chamber. A wind tunnel is provided over the air opening for increasing the speed of the airflow in the roasting chamber as the airflow passes through the wind tunnel.

DETAILED DESCRIPTION OF THE INVENTION

Figure 1:
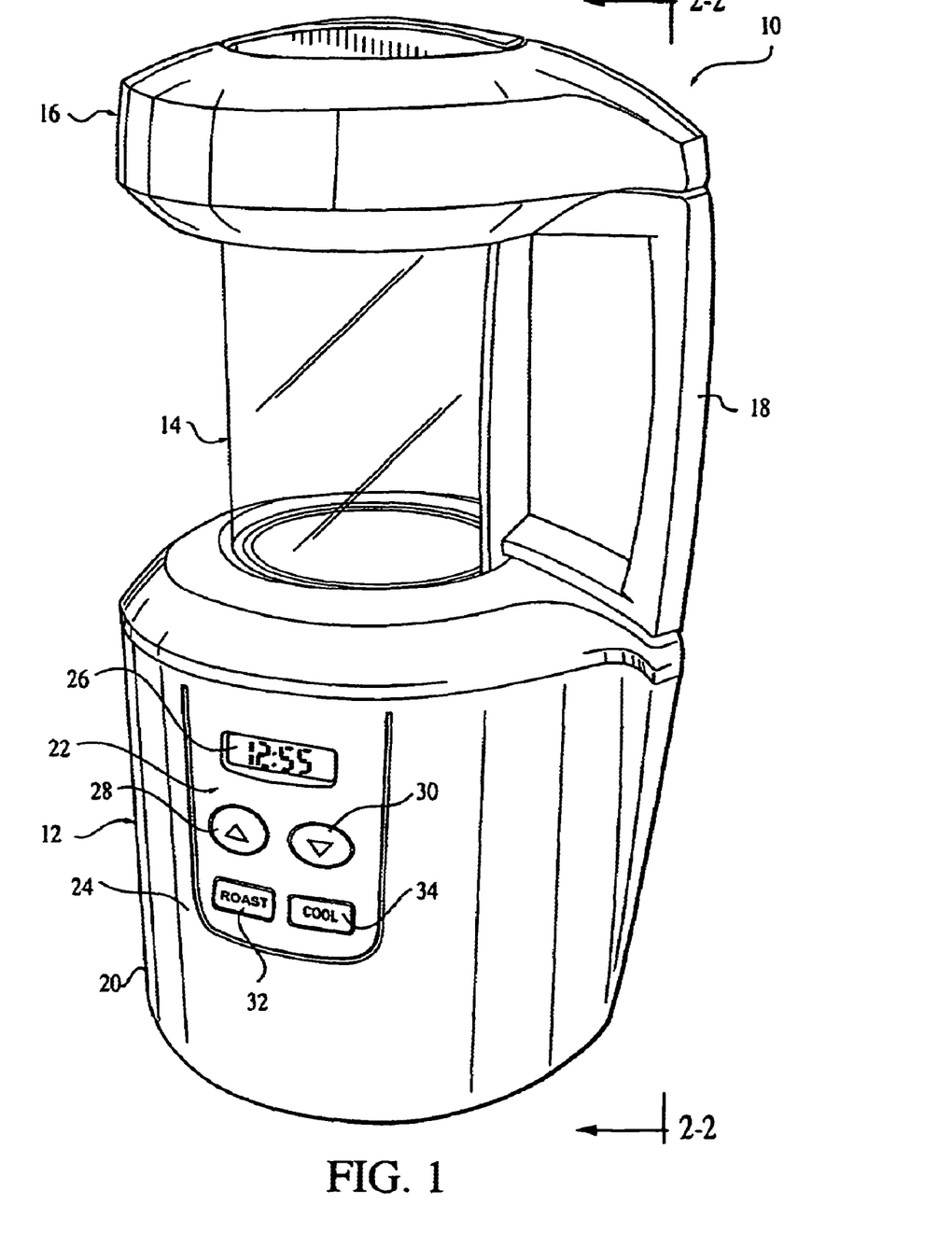
FIG. 1 is a perspective view of a coffee roaster in accordance with an embodiment of the present invention.

Turning now to FIG. 1, a coffee roaster in accordance with an embodiment of the present invention is indicated generally at 10, and includes a base 12, a generally cylindrical roasting chamber 14 seated in the base 12, and a cover 16 removably enclosing the roasting chamber at the opposite end from the base. A handle 18 is attached to the roasting chamber 14 to enable the roasting chamber to be removed from the base 12, and keep the roasting chamber steady while the cover 16 is being removed from or put on the roasting chamber.

The base 12 includes a housing 20 which is made preferably of light-weight plastic material. A control panel 22 is provided on a side 24 of the housing and includes a timer display 26 that shows the time remaining in the roasting process. The time can be adjusted by an UP switch 28 to increase the roasting time and a DOWN switch 30 to decrease the roasting time. The initial time, however, is set automatically to a preset time when the coffee roaster 10 is powered ON. The control panel 22 also includes a ROAST switch 32 that activates the roasting process for the time period displayed in the timer 26. A COOL switch 34 is provided to terminate the roasting process prior to the time displayed in the timer 26. The roaster 10 operates for a predetermined time without heat before being shut down when the COOL switch 34 is activated.

Figure 2:
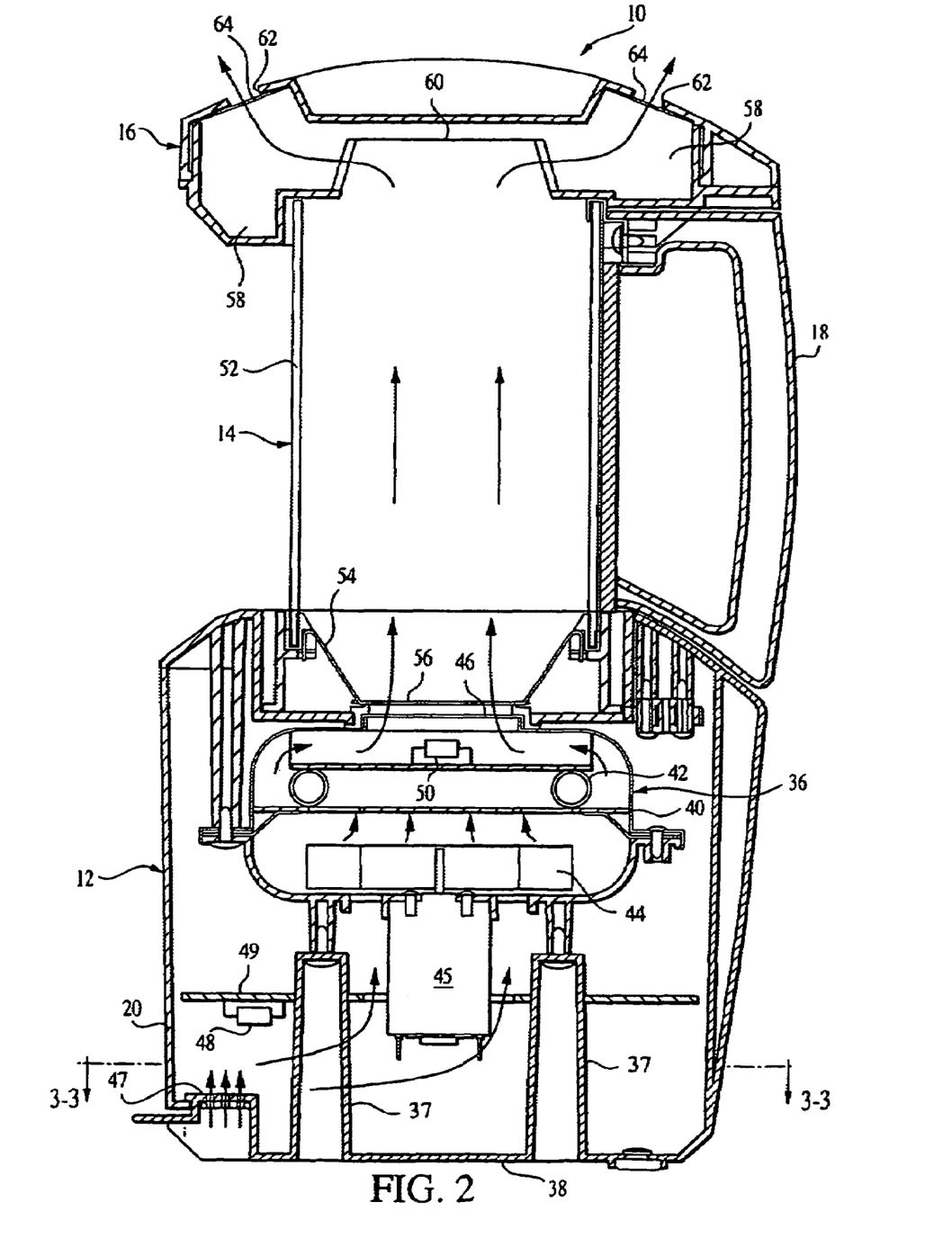
FIG. 2 is a sectional view of the coffee roaster of FIG. 1 along line 2-2.

Turning now to FIG. 2, a heater assembly 36 is provided inside the housing 12 and mounted on at least a pair of upright posts 37 which protrudes upwardly from a bottom 38 of the base 12. The heater assembly 36 includes a casing 40 containing a primary electrical resistance heater 42 located directly over a fan 44. A fan motor 45 is attached to the outside of the casing 40 for rotating the fan 44, which generates an air stream (indicated by curved arrows) that flow through the primary heater 42 and into the roasting chamber 14 through an opening 46 at the top of the heater assembly casing 40. An inlet airflow control assembly 47 is provided generally at the bottom 38 of the base 12 for controlling the volume of outside or ambient air that is pulled into the housing 20 for generating the air stream by the fan 44.

In accordance with an embodiment of the invention, an inlet air temperature sensor 48 is attached to a control board 49 (which is coupled to the posts 22) near the inlet airflow control assembly 47 for sensing the temperature of ambient air that is pulled through the airflow control assembly. The inlet air temperature sensor 48 is preferably a thermistor. In addition to the inlet air temperature sensor 48, an outlet air temperature sensor 50 is located in the heater assembly upstream of the primary heater 42 for detecting the temperature of air entering the roasting chamber 14. Preferably, the roasting temperature sensor 50 is also a thermistor.

The roasting chamber 14 includes a generally cylindrical wall 52 made preferably of heat-resistant, transparent glass or like material to allow the user to view the coffee beans being roasted. The wall 52 is secured at its bottom opening to a cup 54, which has a generally conical shape with a flat bottom 56. The bottom 56 of the cup 54 has a plurality of slits or holes (not shown) which allow air stream from the heater assembly 36 to enter the roasting chamber 14, while preventing coffee beans from falling into the heater assembly. The handle 18 is attached to the wall 52 of the roasting chamber.

The cover 16 is adapted to removably engage the top opening of the roasting chamber wall 52. The cover 16 is made of heat-resistant plastic or like material, and includes a receiver 58 for collecting hulls (not shown) that peel off the coffee beans during roasting and are carried upwardly by the air stream generated by the fan 46 through an opening 60 at the bottom of the cover. Another opening 62 is provided at the top of the cover 16 to allow the air stream to be vented out of the cover. In the preferred embodiment, the top opening 62 is covered with a fine mesh screen 64 to retain the hulls within the receiver 58 of the cover 16.

Figure 3:
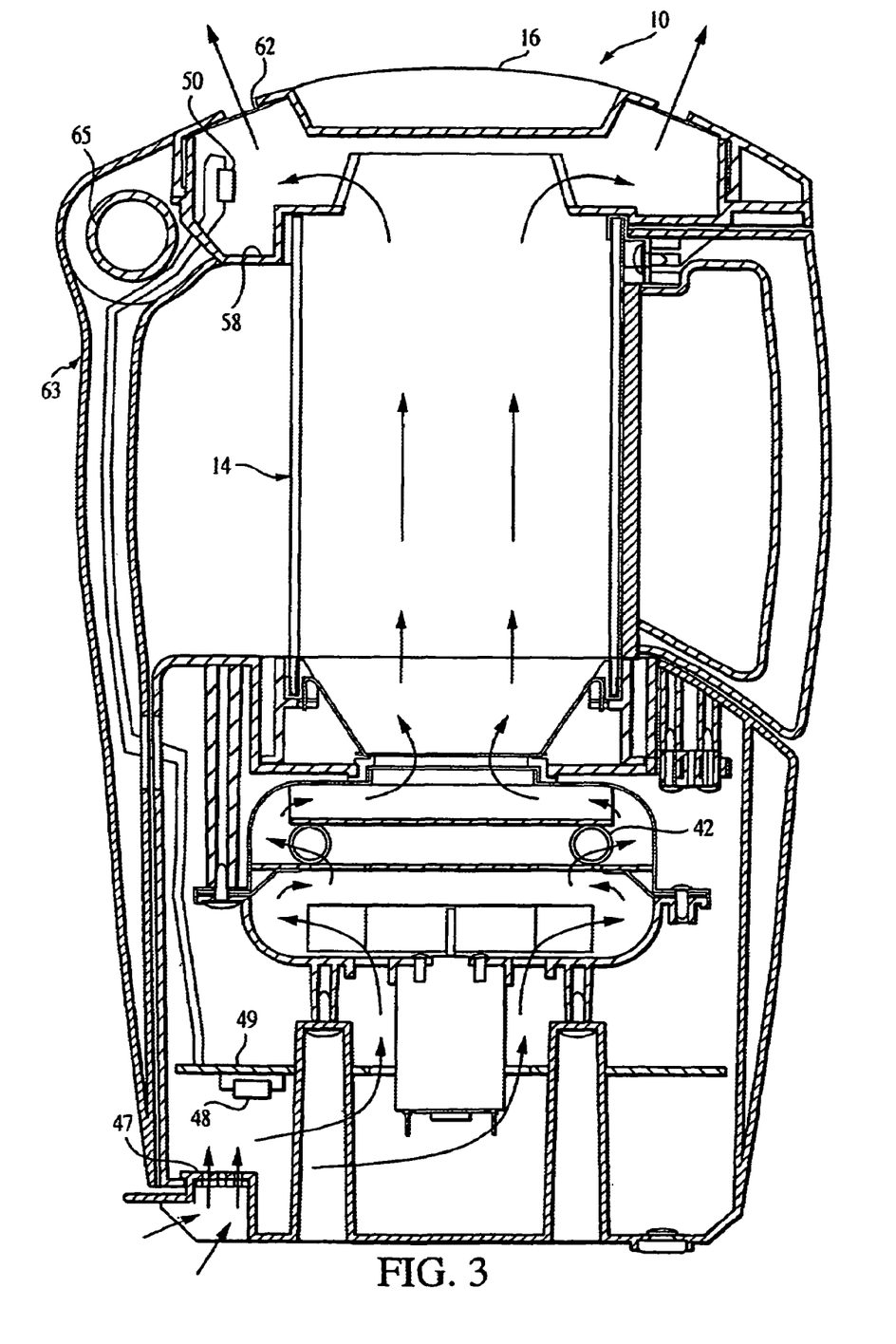
FIG. 3 is a sectional view of the coffee roaster of FIG. 1 along line 2-2, showing an alternate arrangement of temperature sensors.

Turning now to FIG. 3 and in accordance another embodiment of the present invention, the outlet air temperature sensor 50 is located in the hull receiver 58 near the top opening 62 where the air exits the coffee roaster 10. This arrangement allows the sensor 50 to detect the temperature of air exiting the roasting chamber 14. The coffee roaster 10 is also provided with a cover retainer 63 which is attached to the base 12, and connected to the cover 16 to allow the cover to be opened pivotally about an axis 65 and not become separated from the roaster 10. The cover retainer 63 is hollow to enable the temperature sensor 50 to be electrically connected to the control board 49.

Figure 4:
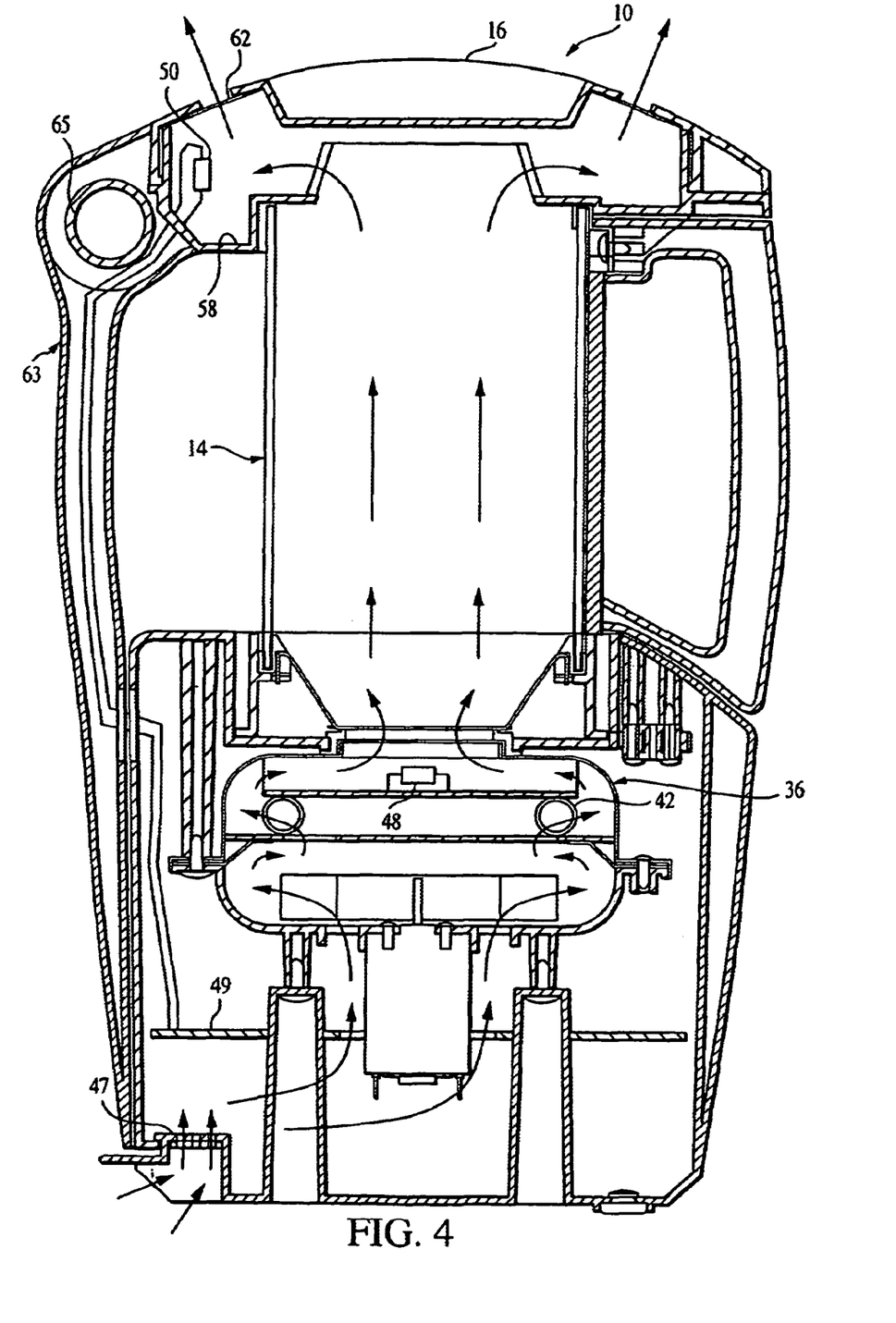
FIG. 4 is a sectional view of a coffee roaster of FIG. 1 along line 2-2, showing an another alternate arrangement of the temperature sensors.

Turning now to FIG. 4, and in accordance yet another embodiment of the present invention, the outlet air temperature sensor 50 is located in the hull receiver 58 near the top opening 62, as in the embodiment shown in FIG. 3. However, the inlet air temperature sensor 48 is located in the heater assembly 36 upstream of the primary heater 42, rather than being placed near the inlet airflow control assembly 47, as in the embodiment shown in FIG. 2. This arrangement allows for detections of difference in the air temperature going into and coming out of the roasting chamber 14. As in the embodiment shown in FIG. 3, the coffee roaster 10 of this embodiment is also provided with a cover retainer 63 which is attached to the base 12, and connected to the cover 16 to allow the cover to be opened pivotally about an axis 65 and not become separated from the roaster 10. The cover retainer 63 is hollow to enable the temperature sensor 50 to be electrically connected to the control board 49.

Figure 5:
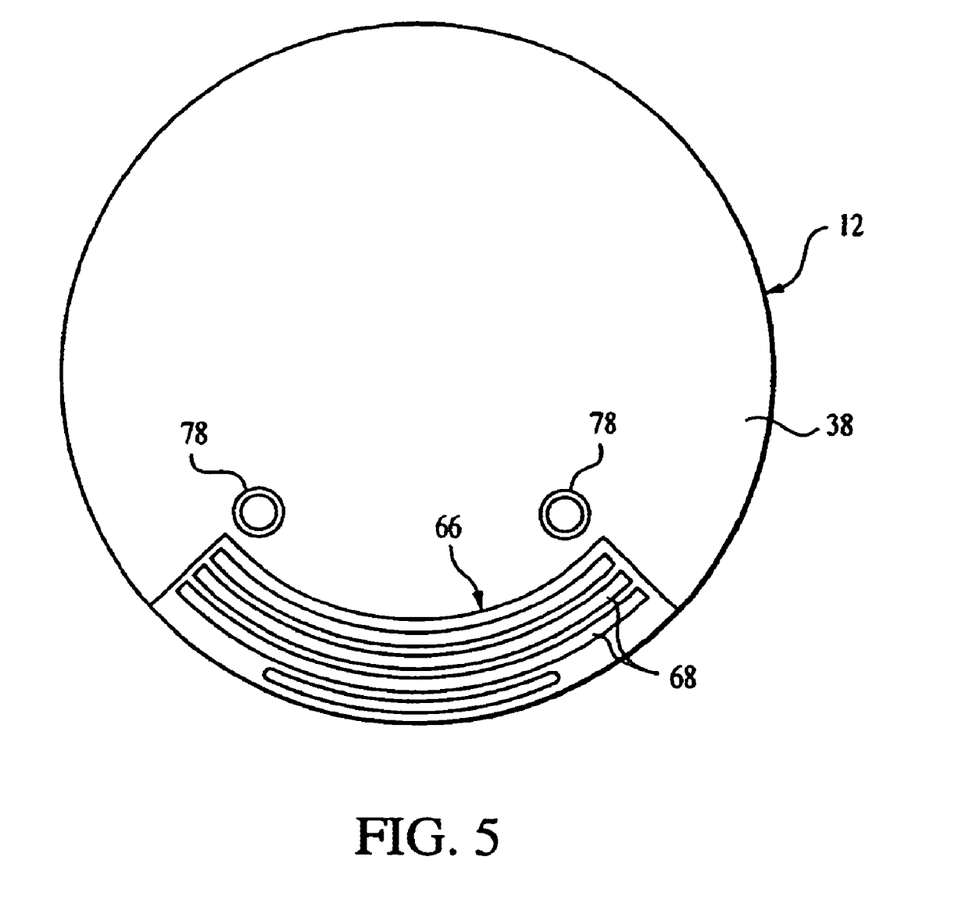
FIG. 5 is a simplified plan view of an air inlet of the coffee roaster of FIG. 1.
Figure 6:
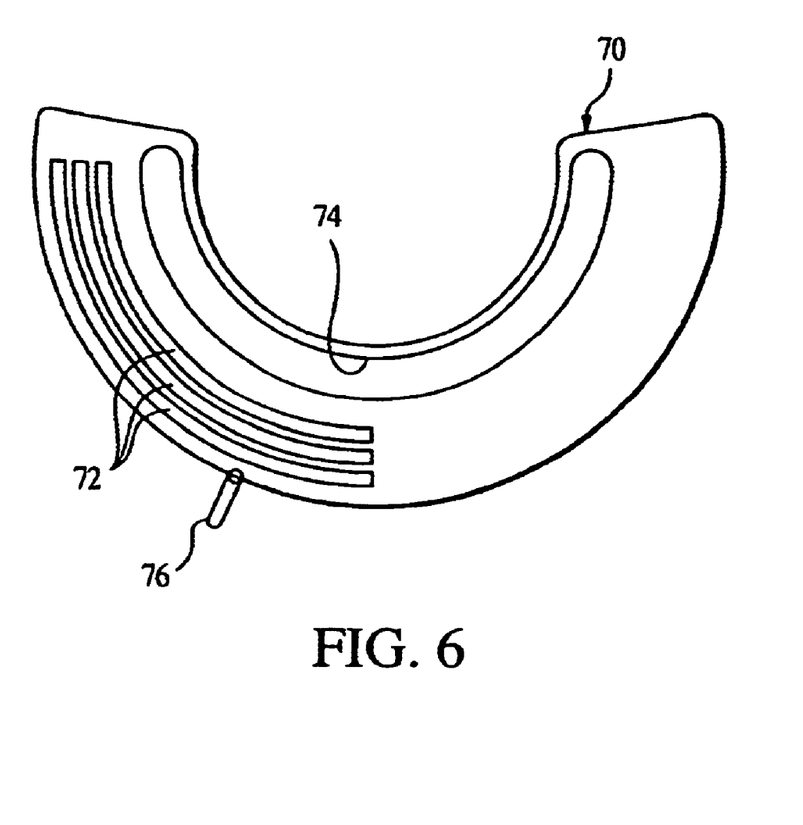
FIG. 6 is a plan view of a cover for controlling airflow through the air inlet shown in FIG. 5.
Figure 7:
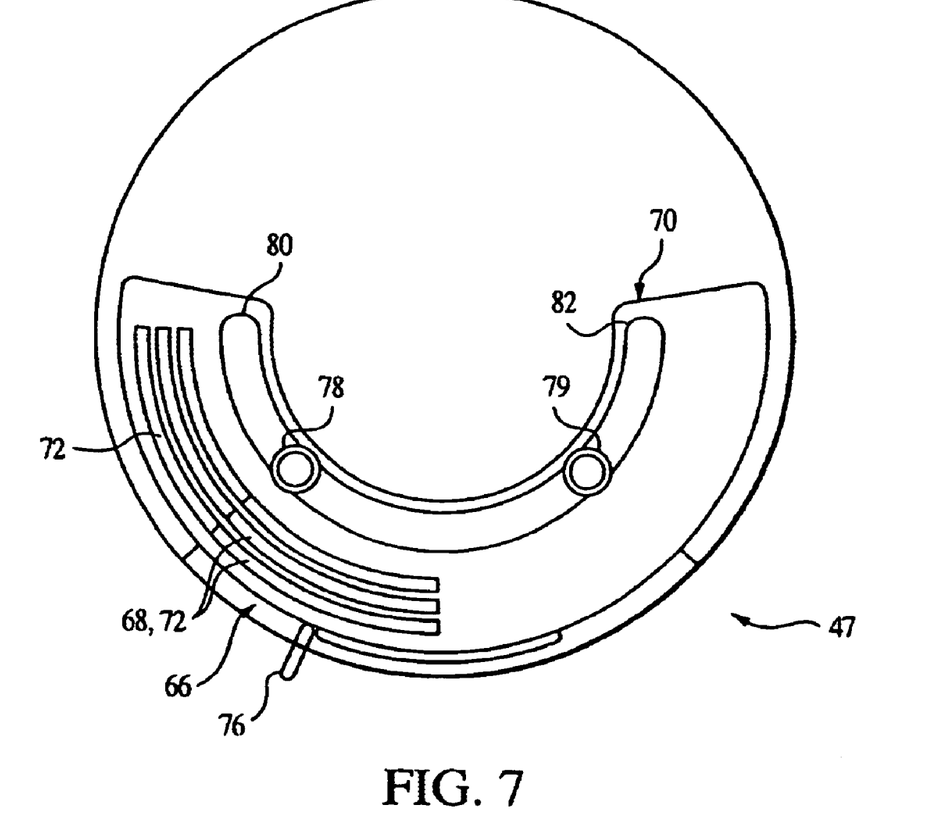
FIG. 7 is a plan view of an inlet airflow control assembly incorporating the air inlet and the cover shown in FIGS. 5 and 6, respectively.

Turning now to FIGS. 5-7, the inlet airflow control assembly 47 includes an air inlet 66 which includes a plurality of elongated openings 68 that are aligned generally parallel to each other (best shown in FIG. 5). The air inlet 66 is formed on the bottom 38 of the base 12. The airflow control assembly 47 also includes a cover 70 (best shown in FIG. 6) having elongated openings 72 that are arranged generally corresponding to the openings 68 on the air inlet 66. The openings 72 extend from near one end of the cover 70 to approximately the middle of the cover 70. The cover 70 also has an elongated guide channel 74 that extends substantially the length of the cover 70. A slide lever 76 is attached to the cover 70 at about the middle of the cover 70.

When assembled, as shown in FIG. 7, the openings 68 on the air inlet 66 and the openings 72 on the cover 70 substantially align with each other. A pair of spaced stops 78, 79 protruding from the bottom 38 of the housing 12 is inserted in the guide channel 74. The stops 78, 79 keep the cover 70 in sliding contact with the air inlet 66 and act as boundary to limit the sliding movement of the cover on the surface of the air intake 66.

In operation, the openings 68 of the air intake 66 become more exposed when the lever 76 is moved to the right or in the counterclockwise direction, until fully exposed when the left end 80 of the channel 74 comes in contact with the nearest stop 78. On the other hand, the openings 68 become less exposed when the lever 76 is moved to the right, in the clockwise direction, until fully closed by the half of the cover 70 that does not have any openings, when the right end 82 of the channel 74 comes in contact with its nearest stop 79.

In this manner, the inlet airflow control assembly 47 allows the user to control the volume of air permitted into the base 12 of the roaster 10, and accordingly, into the roasting chamber 14 in the air stream generated by the fan 46. An increase in the air volume in the roasting chamber 14 generally reduces the temperature in the chamber, and a decrease in the air volume generally results in a temperature increase in the chamber. Thus, the airflow control assembly 47 offers the user a greater control over the roasting temperature.

Figure 8:
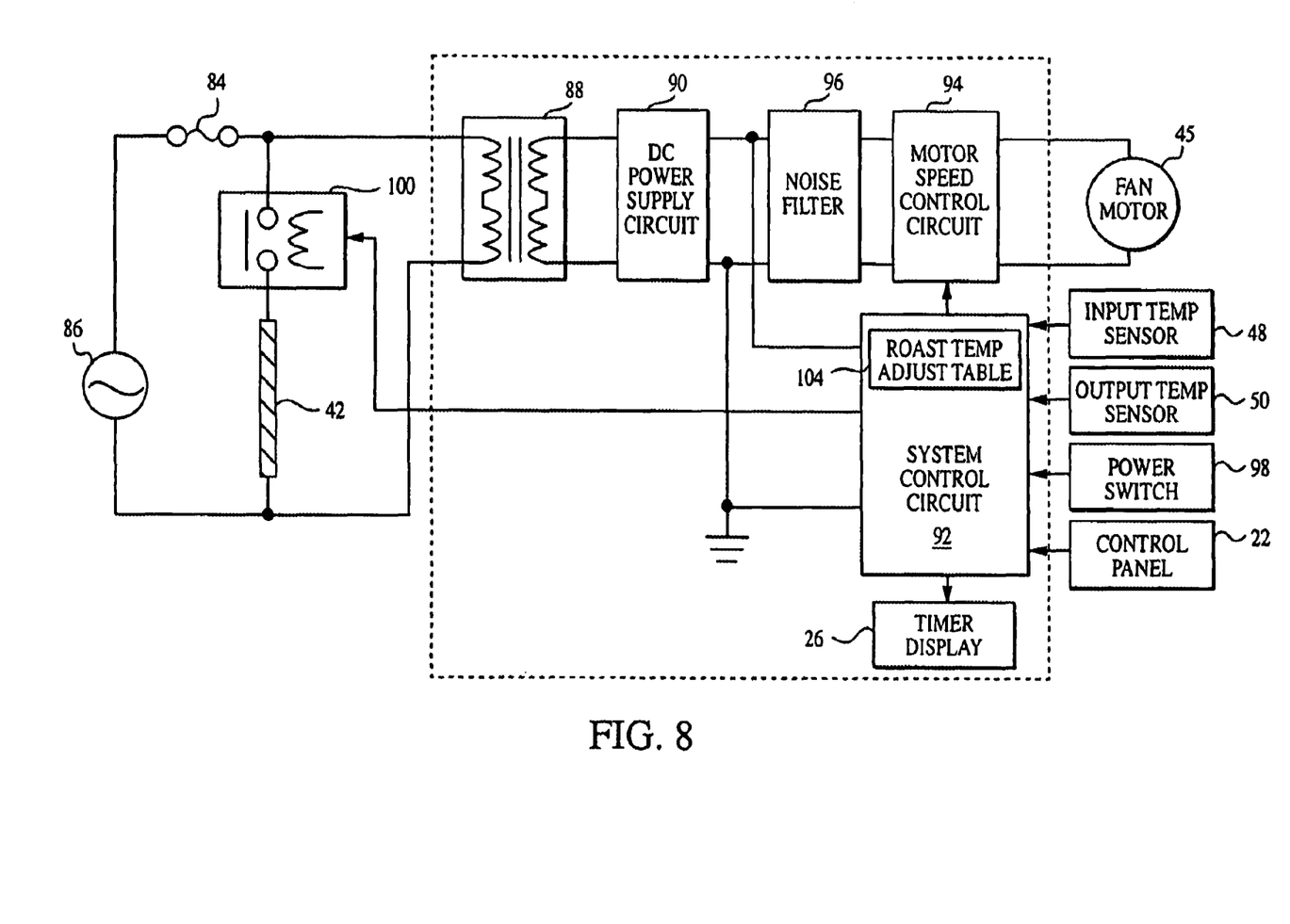
FIG. 8 is a electrical block diagram of the coffee roaster of FIG. 1.

Turning now to FIG. 8, the coffee roaster 10 is provided with a thermal protector 84, which may be a thermal fuse or a thermostat, that activates to disconnect power from AC line voltage 86 to the roaster in the event the thermal fuse is heated above its rated temperature. A power transformer 88 is also provided to reduce the input line voltage 86 to an operating level of the roaster 10, approximately 15 VAC. A DC power supply circuit 90 converts the reduced AC voltage from the transformer 88 to DC voltage, which is supplied to a system control circuit 92 and to a motor speed control circuit 94 via a noise filter 96. The system control circuit 92 receives input signals from the inlet and outlet temperature sensors 48, 50, a power switch 98 and the control switches 28, 30, 32, 34 on the control panel 22, and outputs control signals to the primary heater 42 via a power relay 100, the motor speed control circuit 94 and to the timer display 26. The motor speed control circuit 94 controls the speed of the fan motor 45, based on signals received from the system control circuit 92, by varying the voltage applied to the motor, for example, in the range of approximately 4.5 V to 15 V. The power switch 98 is provided as a safety switch to disconnect power 86 to the primary heater 42 when the roasting chamber 14 is removed from the base 12.

Figure 9:
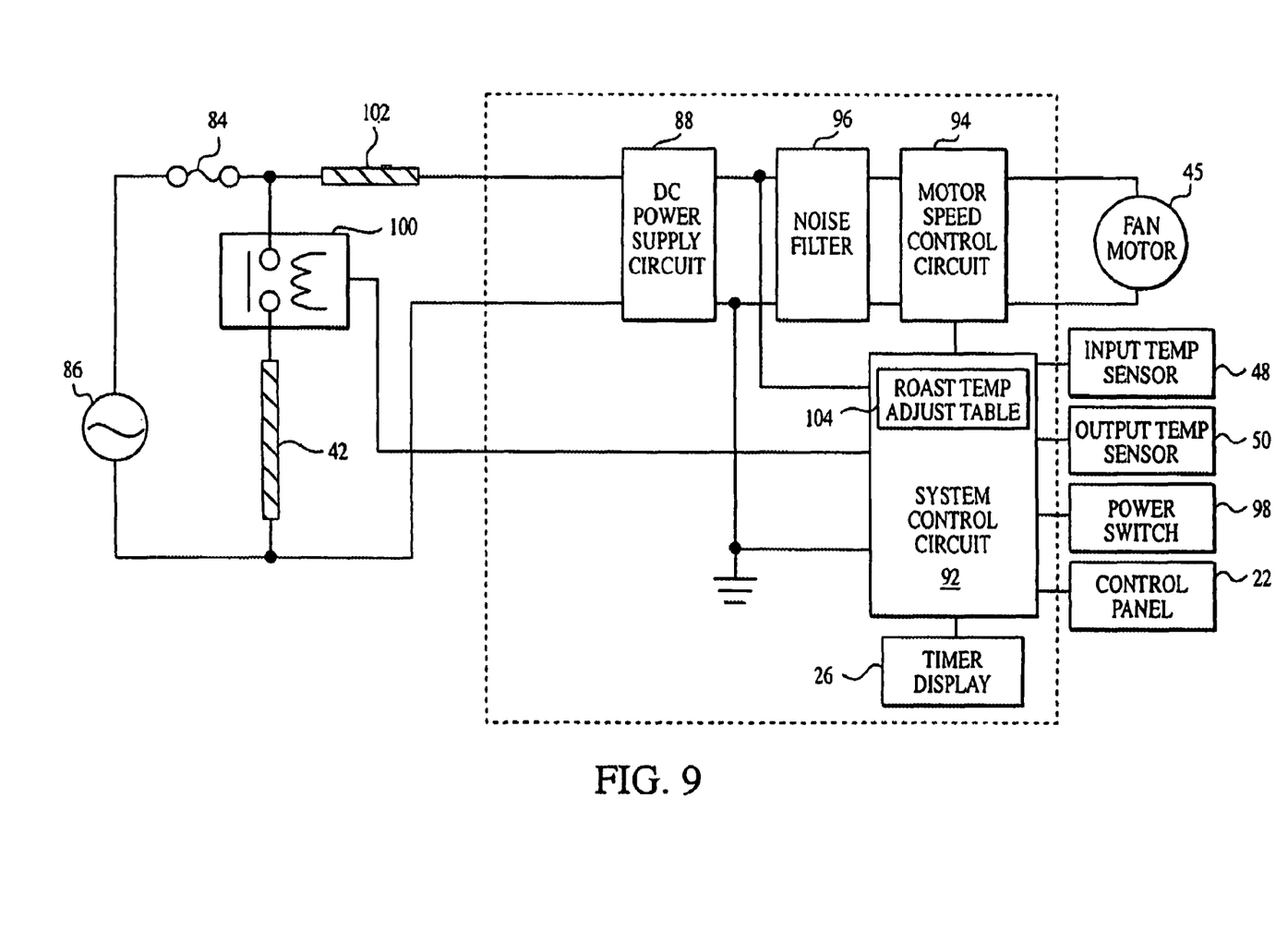
FIG. 9 is a electrical block diagram of the coffee roaster of FIG. 1 in accordance with another embodiment of the present invention.
Figure 10:
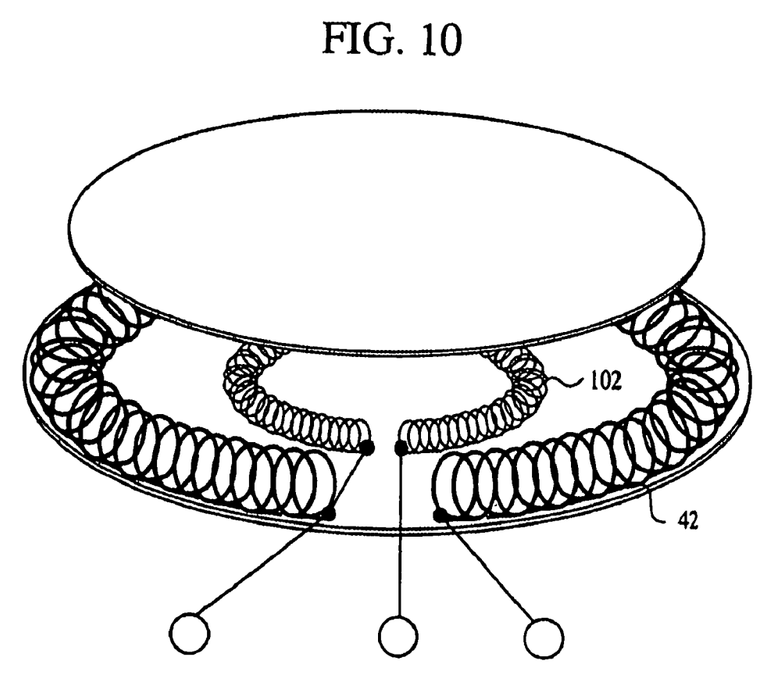
FIG. 10 is a diagram of a subheater shown in FIG. 9.

Referring to FIGS. 9 and 10, and in accordance with another embodiment of the present invention, a subheater 102 is connected between the input AC line voltage 86 and the DC power supply circuit 88 for reducing the AC line voltage to a lower operating voltage of approximately 15 VAC, for example. This reduced AC voltage is then converted to DC voltage by the DC power supply circuit 88 as in the embodiment shown in FIG. 8. The subheater 102 is provided within the casing 40 of the heater assembly 36 along with the primary heater 42 (best shown in FIG. 10).

Figure 11:
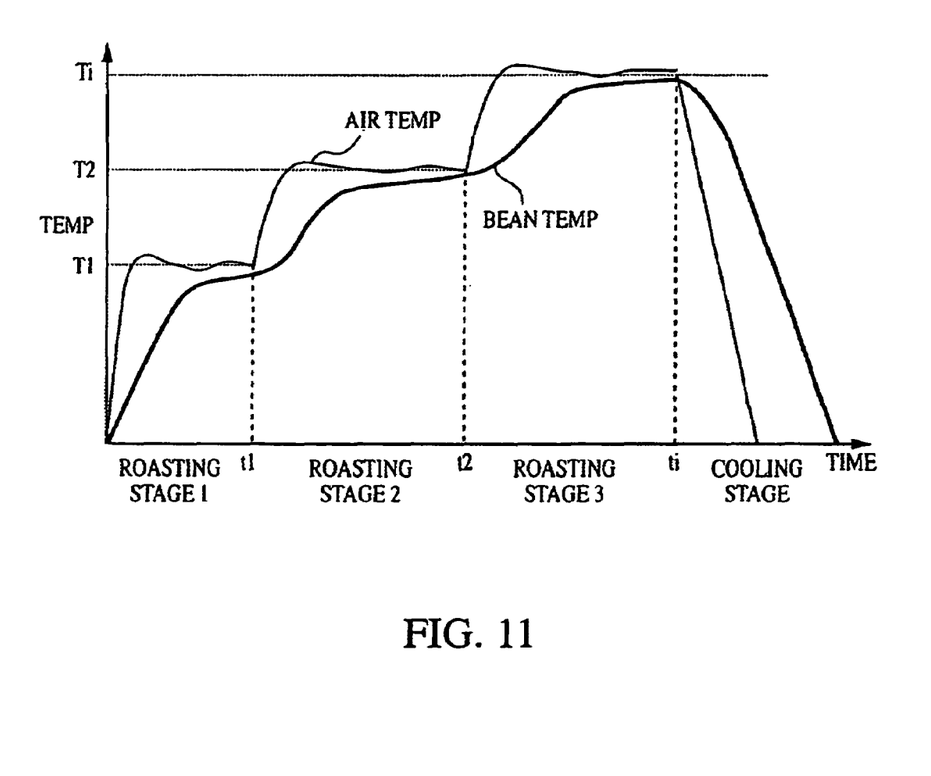
FIG. 11 is a graph showing the relationship between the temperature of air inside a roasting chamber of the coffee roaster of FIG. 1 and the coffee beans being roasted.

Turning now to FIG. 11, and in accordance with one embodiment of the present invention, the coffee roaster 10 is adapted to have at least two roasting stages where the temperature in the subsequent roasting stage is higher than that of the preceding roasting stage. In the preferred embodiment, there are three roasting stages, which is followed by a cooling stage. In the first stage the air inside the roasting chamber 14 closely follows the predetermined air temperature curve shown in FIG. 11 up to a temperature T1 of approximately 200° C. for a predetermined time t1 of approximately 3 minutes. In the second stage, the temperature in the roasting chamber 14 rapidly and closely follows the air temperature curve to a predetermined temperature T2 of approximately 220° C., which is higher than T1. This temperature is maintained for approximately 3 minutes until time t2, at which time the temperature in the roasting chamber is again rapidly raised and closely follows the air temperature curve to a predetermined temperature T3 of approximately 240° C., and maintained for approximately 2 minutes until time t3, at which time the temperature in the roasting chamber is allowed to rapidly cool within a predetermined period, as shown by the portion of the air temperature curve in the cooling stage, approximately 3 minutes. In this manner, the temperature of the beans closely tracks the predetermined air temperature curve and undergo a series of predictable roasting cycles to become uniformly roasted. It should be understood that the temperatures T1, T2, T3 and the times t1, t2, t3 given above are only examples, and that other temperatures and times are contemplated.

In operation, when the ROAST switch 32 (best shown in FIG. 1) is depressed by the user, the coffee roaster 10 automatically enters the three-stage roasting stages described above and programmed in the system control circuit 92. When the timer switches 28, 30 are activated to set the roasting time by the user, the roaster 10 goes through the programmed roasting stages, but stops the roasting process at the current roasting stage that it is in when the set time has elapsed, and automatically enters the cooling stage for a predetermined time.

During each roasting stage, the inlet temperature sensor 48 and the outlet temperature sensor 50 measure the air temperature at their respective locations, to allow the system control circuit 92 to closely follow the predetermined air temperature curve throughout each roasting stage. In the preferred embodiment, the inlet temperature sensor 48 is located near the inlet airflow control assembly 47, so as to measure the temperature of ambient air entering the coffee roaster 10 (best show in FIG. 2). The outlet temperature sensor 50 is located proximately downstream of the heater 42 to measure the temperature of air entering the roasting chamber 14.

Turning back to FIG. 8, and in accordance with the present invention, the system control circuit 92 sends a signal to the motor speed control circuit 94 to decrease power to the fan motor 45, so as to decrease airflow to the roasting chamber 14, which raises the temperature within the roasting chamber. Conversely, the system control circuit 92 sends a signal to the motor speed control circuit 94 to increase power to the fan motor 45, so as to increase airflow to the roasting chamber 14, which lowers the temperature within the roasting chamber 14.

In the preferred embodiment, the system control circuit 92 is programmed with a roasting temperature adjustment table 104 which gives information as to power that should be applied to the fan motor 45 (via the motor speed control circuit 94) to track the predetermined air temperature curve (best shown in FIG. 11) at various ambient temperature ranges, as detected by the inlet temperature sensor 48. Depending on the ambient temperature, the temperature of air entering the roasting chamber 14 will vary substantially even when the power to the fan motor 45 is constant. For example, the temperature of air entering the roasting chamber 14 when the ambient temperature is substantially below room temperature (as when the roaster 10 is operated outdoors on a winter day) will be significantly lower than the temperatures produced by the heater assembly 36 operating at the same fan motor power, but at room temperature. Also, it will require longer time to reach the desired temperature when the ambient temperature is substantially below room temperature, and may not be able to reach it under some ambient temperatures. The roasting temperature adjustment table 104 and the inlet and outlet air temperature sensors 48, 50 provide information necessary for the system control circuit 92 to control the power that is applied to the fan motor 45, so that the predetermined temperature curve is closely tracked despite variations in the ambient temperature.

In accordance with another embodiment of the invention, only one temperature sensor, the outlet temperature sensor 50 shown in FIG. 2, is utilized to obtain the desired temperature in the roasting chamber 14. In this arrangement, the system control circuit 92 receives the temperature of airflow entering the roasting chamber 14 measured periodically (e.g., every 5 seconds) by the temperature sensor 50. If the measured temperature varies from the predetermined temperature curve, the system control circuit 92 outputs a signal to the motor speed control circuit 94 to decrease power to the fan motor 45, thereby increasing air temperature. On the other hand, if the measured temperature is higher than the desired temperature, power to the fan motor 45 is increased to decrease the air temperature inside the roasting chamber 14.

In the embodiment described above in which the inlet air temperature sensor 48 is provided near the inlet airflow control assembly 47 and the outlet air temperature sensor 50 provided in the cover 16, as shown in FIG. 3, the control of the temperature inside the roasting chamber 14 is similar to the two sensor 48, 50 embodiment described above. In other words, the system control circuit 92 controls the power that is applied to the fan motor 45 to achieve the predetermined air temperature curve in the roasting chamber 14 at various ambient temperature ranges.

In the embodiment described above in which the input temperature sensor 48 is provided proximate and downstream of the heater 42 and the output temperature sensor 50 is provided in the cover 16, as shown in FIG. 4, the system control circuit 92 controls the power supplied to the fan motor 45 (via the motor speed control circuit 94), so that the temperature inside the roasting chamber 14 tracks the predetermined temperature curve, by taking the average of temperatures at the two locations of the sensors 48, 50.

Figure 12:
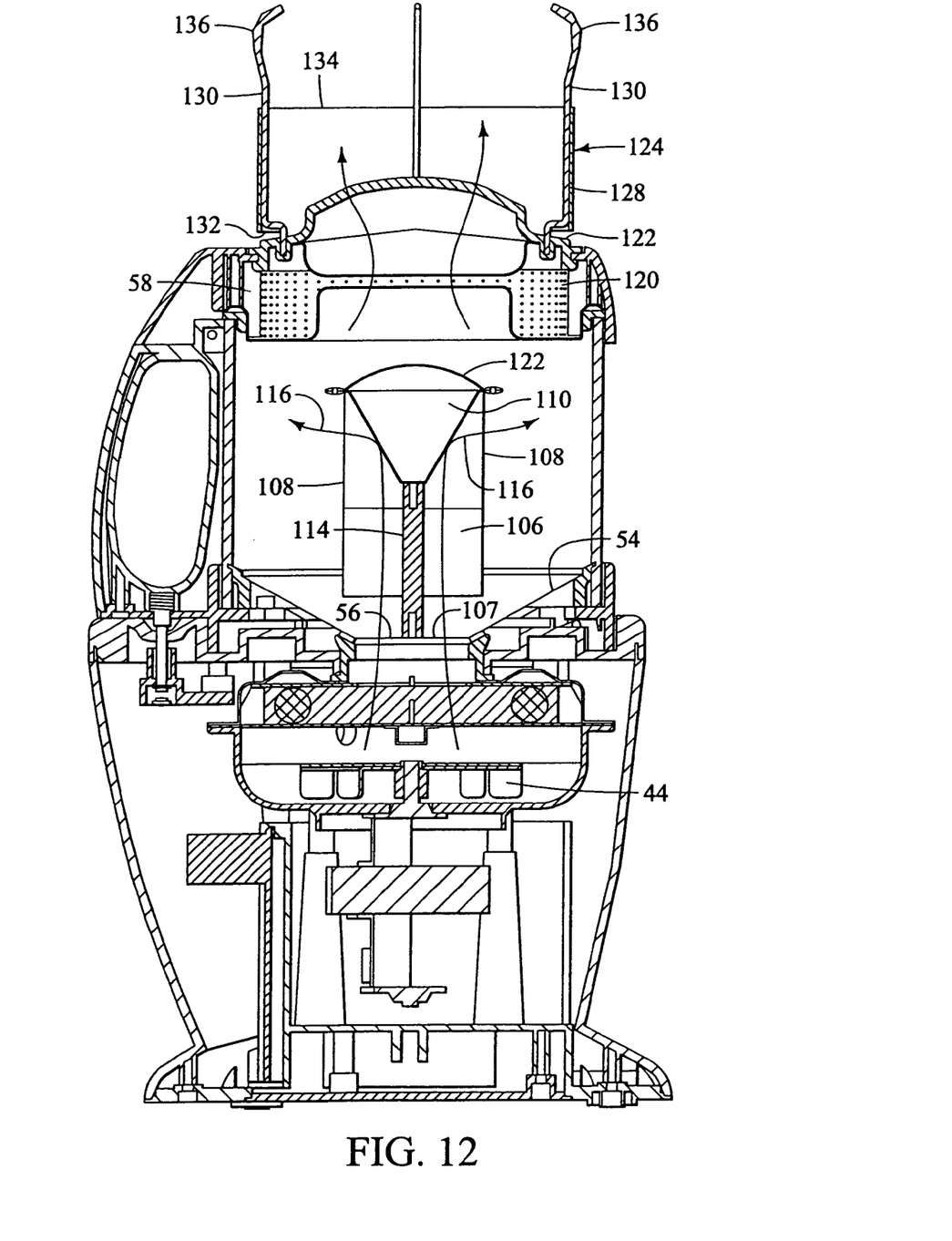
FIG. 12 is a sectional view of a coffee roaster shown with a wind tunnel in accordance with an embodiment of the present invention.

Turning now to FIG. 12 and in accordance with another embodiment of the present invention, a generally cylindrical wind tunnel 106 is positioned above the openings 107 in the bottom 56 of the cup 54. The diameter of the wind tunnel is such that it substantially encompasses the openings 107. The wind tunnel 106 is suspended above the bottom 56 by four support arms 108 (two shown in FIG. 12) which extend from the top of the wind tunnel and spaced generally evenly around the circumference thereof. The arms 108 are substantially rigid so as to maintain the wind tunnel 106 in a fixed position above the openings 107. The arms 108 may be formed from the same thin sheet of metal as the wind tunnel 106 and attached to the wind tunnel, or formed integral with the wind tunnel.

The support arms 108 at the end opposite the wind tunnel 106 are secured to the circumference of a mushroom or cone-shaped deflector 110. The diameter of the deflector 110 at its widest portion is substantially the same as the diameter of the wind tunnel 106. The deflector 110 has a generally rounded dome 112 so as to prevent the coffee beans from resting on the top of the deflector. The bottom of the deflector is securely connected to one end of a post 114, which at its other end is fixed to the bottom 56 of the cup 54. The post 114 may be connected at its ends to the deflector 110 and the bottom 56 by any known means, such as welding, riveting, screws, etc. The support arms 108 may be attached to the deflector 110 and the wind tunnel 106 through any of the same means.

In operation, as the heated air stream 116 (generated by the fan 44) enters the roasting chamber 14, it is routed through the wind tunnel 106, which increases the velocity of the air stream, as a result of the decreased surface area in the path of the air stream in the roasting chamber. As the air stream exits the wind tunnel 106, it deflects off the side of the deflector 110 and eventually exits the roasting chamber 14 through the top opening 62 in the cover 16 (best shown in FIG. 13).

The wind tunnel 106 is spaced sufficiently from the bottom 56 of the cup 54 to enable the coffee beans (not shown) to be freely lifted up through the wind tunnel by the air stream 116 from the bottom of the cup. There is also a sufficient gap between the wind tunnel 106 and the deflector 110, so as to enable the coffee beans being carried by the air stream 116 to exit the wind tunnel freely, and be deflected away by the deflector 110.

The wind tunnel 106 increases the velocity of the heated air stream 116, thereby allowing the same amount of beans to be roasted at a much lower motor RPM, which results in the coffee roaster 10 being operated more quietly and having a longer motor life. The wind tunnel 106 also enables the coffee roaster 10 to increase roasting capacity. The faster air stream 116 resulting from the passage through the wind tunnel 106 strengthens the blowing/moving power of the hot air stream, thereby increasing the quantity of beans that are being blown through and roasted in the hot air stream.

Figure 13:
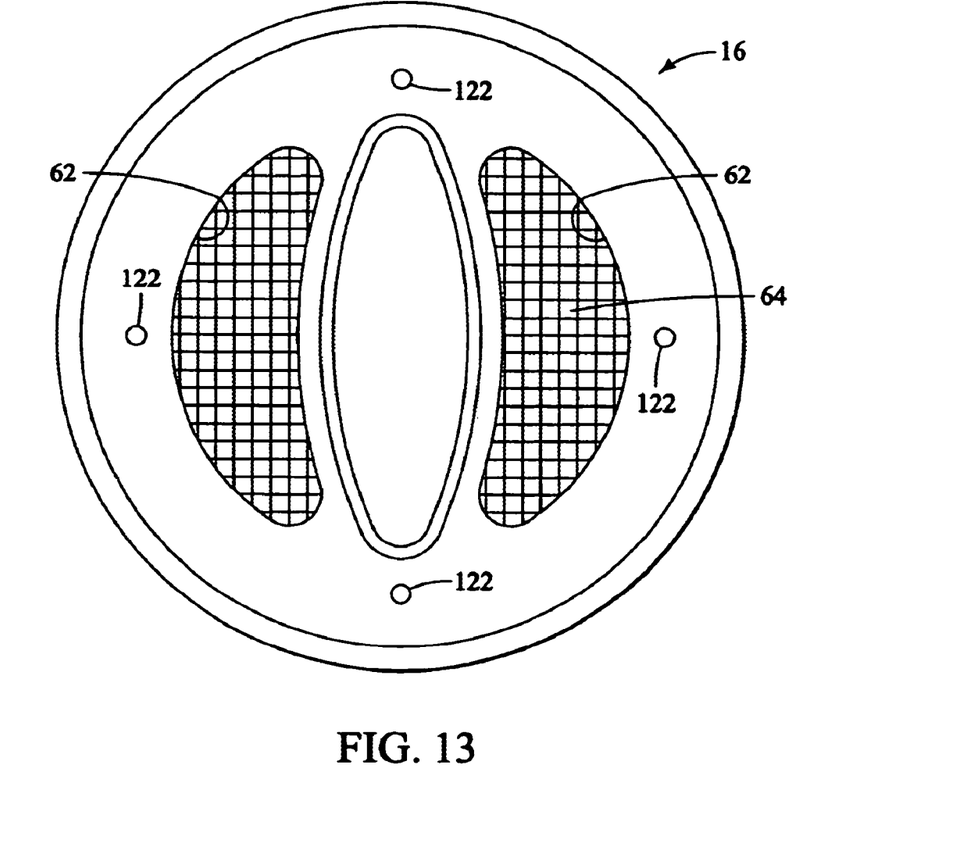
FIG. 13 is a plan view of a cover of the coffee roaster of FIG. 12 in accordance with one embodiment of the present invention.

As the coffee beans are roasted, they give off smoke, which escapes through two openings 62 in the cover 16. As shown in FIG. 13, the openings 62 similar to the embodiments shown above, are covered with a fine mesh screens 64 to retain the halls of the roasted beans within the receiver 58 of the cover 16. The screen 64 should be a wire mesh to withstand the heat from the roasting chamber 14. In the embodiment of the coffee roaster 10 shown in FIG. 12, the cover 16 includes a cylindrical ring 120 made of thin sheet metal with a plurality of holes for collecting the hulls in the cover 16.

Figure 14:
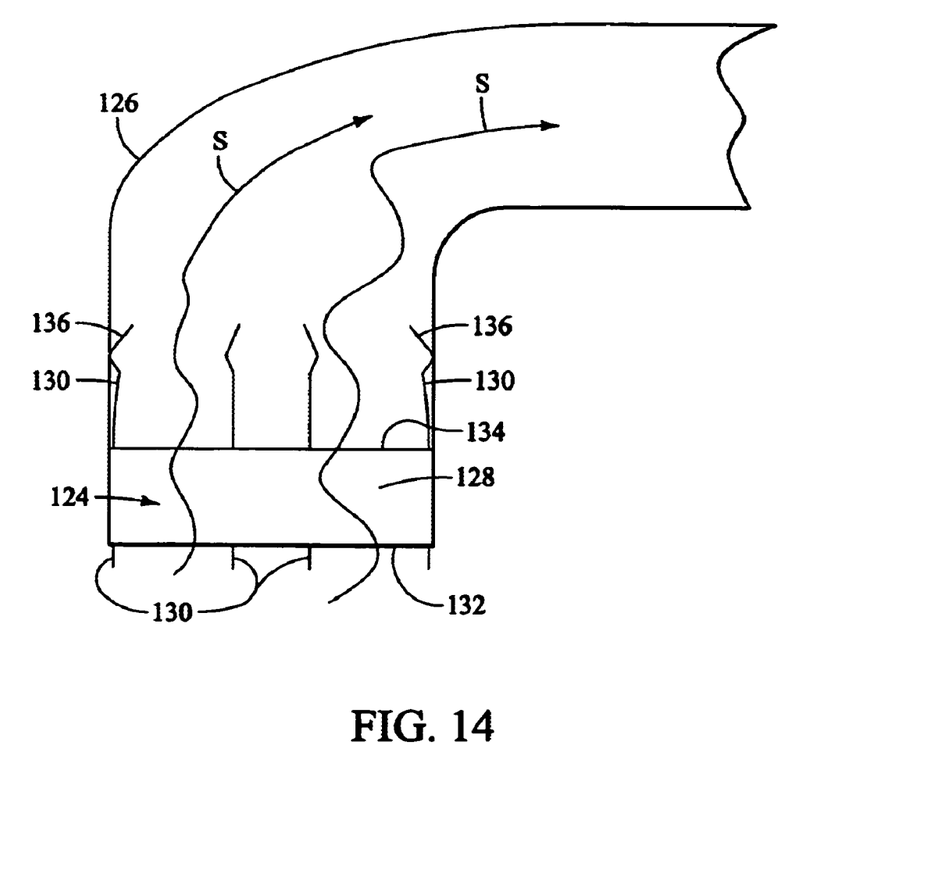
FIG. 14 is a sectional view showing a smoke vent attachment connected to a vent tube for venting smoke.

The cover 16 additionally includes a plurality of mounting holes 122 for having a smoke vent attachment 124 removably mounted there on. The vent attachment 124 is configured matingly and removably to be connected to a vent pipe 126 made of flexible aluminum or other heat resistant pipe such as those used for venting hot air from a clothes dryer, as shown in FIG. 14. The vent attachment 124 includes a cylindrical ring portion 128, the diameter of which is sufficiently large as to encompass the openings 62 on the cover 16. The height of the ring portion should be such that it is able to matingly receive a portion of the vent pipe 126 to form a seal, which is sufficiently tight as to prevent smokes from escaping between the ring portion and the vent pipe.

The ring portion 128 is formed from a sheet metal or other material with a thickness sufficient to rigidly maintain its cylindrical shape and withstand the heat from the roasting chamber 14. On the inside of the ring portion 128 a number of substantially rigid metal wires 130 are spaced generally equally apart from each other. Four wires 130 are in one embodiment. The wires 130 extend beyond a bottom end 132 of the ring portion 128 and are matingly inserted into the mounting holes 122 on the cover 16 so that the vent attachment 124 is securely seated on the cover. The wires 130 also extend beyond a top end 134 of the ring portion 128. In the preferred embodiment, the portion of the wires 130 at the top end 134 of the ring portion 128 are bent into a generally S shape, so that a curved portion 136 extend slightly beyond the circumference of the ring portion, so that the wires press against the vent pipe 126 to prevent it from coming off the smoke vent attachment 124 (best shown in FIG. 14).

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A roaster for roasting coffee beans comprising:

a roasting chamber having a top and a bottom;

a cover seated on said top of said roasting chamber;

a base on which said bottom of said roasting chamber is seated;

a fan provided in said base for supplying hot airflow into said roasting chamber for heating coffee beans;

at least one air opening formed on said bottom for enabling said airflow to enter said roasting chamber;

a wind tunnel provided over said at least one air opening and having an inlet and an outlet for increasing the speed of said airflow in said roasting chamber as said airflow passes through and exits said wind tunnel; and a coffee bean deflector positioned above said outlet of said wind tunnel for deflecting the coffee beans carried by said airflow exiting said wind tunnel.

2. The roaster as defined in claim 1 wherein said coffee bean deflector is attached to said bottom of said roasting chamber by an elongated post, and said wind tunnel is suspended from said deflector by a plurality of support arms.

3. The roaster as defined in claim 2 wherein said wind tunnel is spaced above said at least one opening to enable the coffee beans from said bottom of said roasting chamber to be carried into said wind tunnel by said airflow.

4. The roaster as defined in claim 3 wherein said wind tunnel has a generally cylindrical configuration and a diameter which substantially encompasses said at least one opening on said bottom of said roasting chamber.

5. The roaster as defined in claim 1 wherein said coffee bean deflector has a rounded top for preventing coffee beans from resting on a top of said deflector.

6. The roaster as defined in claim 1 wherein said wind tunnel is spaced above said openings to enable the coffee beans from said bottom of said roasting chamber to be carried into said wind tunnel by said airflow.

7. The roaster as defined in claim 6 wherein said wind tunnel has a generally cylindrical configuration and a diameter which substantially encompasses said at least one opening on said bottom of said roasting chamber.

8. An apparatus for increasing airflow in a coffee bean roaster including a roasting chamber having a top and a bottom, a cover seated on the top of the roasting chamber, a base on which the bottom of the roasting chamber is seated, and at least one air opening formed on the bottom of the roasting chamber for enabling airflow to enter the roasting chamber from a fan provided in the base, said apparatus comprising:

a wind tunnel provided over the air opening and having an inlet and an outlet for increasing the speed of the airflow in said roasting chamber as the airflow passes through and exits said wind tunnel;

a plurality of support arms for suspending said wind tunnel above the at least one air opening on the bottom of the roasting chamber; and a coffee bean deflector positioned substantially above said outlet of said wind tunnel for deflecting coffee beans carried by the airflow exiting said wind tunnel.

9. The apparatus as defined in claim 8 wherein said deflector is attached to the bottom of the roasting chamber by an elongated post, and the wind tunnel is suspended from said deflector by said plurality of support arms.

10. The apparatus as defined in claim 9 wherein said wind tunnel is spaced above the opening to enable coffee beans from the bottom of the roasting chamber to be carried into said wind tunnel by the airflow.

11. The apparatus as defined in claim 10 wherein said wind tunnel has a diameter which substantially encompasses the opening on the bottom of the roasting chamber.

12. The apparatus as defined in claim 8 wherein said coffee bean deflector has a rounded top for preventing coffee beans from resting on top of said deflector.

13. A roaster for roasting coffee beans, comprising:

a roasting chamber;

a fan for supplying heated airflow into said roasting chamber;

a cover seated on top of said roasting chamber;

at least one exhaust opening provided on said cover for allowing smoke from said roasting chamber to exit therefrom, while preventing coffee beans and chaff from escaping therethrough; and a smoke vent attachment having a plurality of feet for engaging corresponding plurality of mounting holes formed on said cover to enable said vent attachment to be removably mounted on said cover for receiving smoke exiting through said at least one exhaust opening on said cover, and a plurality of arms configured and adapted to enable said vent attachment to be removably connected to an opening of an elongated external vent pipe for channeling the smoke away from said roaster.

14. The roaster as defined in claim 13 wherein said smoke vent attachment includes a substantially cylindrical ring portion having a diameter which encompasses said at least one opening on said cover.

15. The roaster as defined in claim 14 wherein said plurality of arms are attached to and extend from a first end of said ring portion, and are configured to extend beyond a circumference of said ring portion.

16. The roaster as defined in claim 15 wherein said plurality of feet are attached to and extend from a second end of said ring portion.

* * * * *